(12) United States Patent
Broussard et al.

(10) Patent No.: US 12,254,269 B2
(45) Date of Patent: *Mar. 18, 2025

(54) MACHINE LEARNING RECOMMENDATION ENGINE FOR CONTENT ITEM DATA ENTRY BASED ON MEETING MOMENTS AND PARTICIPANT ACTIVITY

(71) Applicant: Dropbox, Inc., San Francisco, CA (US)

(72) Inventors: Matthew Broussard, San Francisco, CA (US); Emma Highley, Santa Monica, CA (US); Behrooz Khorashadi, Davis, CA (US); Devangi Vivrekar, San Jose, CA (US); Hudson Arnold, Alameda, CA (US); Shehzad Daredia, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,831

(22) Filed: Feb. 13, 2024

(65) Prior Publication Data

US 2024/0184987 A1 Jun. 6, 2024

Related U.S. Application Data

(63) Continuation of application No. 17/363,883, filed on Jun. 30, 2021, now Pat. No. 12,050,868.

(51) Int. Cl.
*G06F 40/274* (2020.01)
*G06N 20/00* (2019.01)
*H04L 12/18* (2006.01)

(52) U.S. Cl.
CPC ........... *G06F 40/274* (2020.01); *G06N 20/00* (2019.01); *H04L 12/1831* (2013.01)

(58) Field of Classification Search
CPC .... G06F 40/274; G06N 20/00; H04L 12/1831
USPC ....................... 704/8, 10, 231, 243
See application file for complete search history.

(56) References Cited

U.S. PATENT DOCUMENTS

| | | |
|---|---|---|
| 6,377,965 B1 | 4/2002 | Hachamovitch et al. |
| 8,645,825 B1 | 2/2014 | Cornea et al. |
| 9,710,819 B2 | 7/2017 | Cloran et al. |
| 9,786,283 B2 | 10/2017 | Baker |
| 10,733,614 B2 | 8/2020 | Sapoznik et al. |
| 10,915,570 B2 | 2/2021 | Ramamurthy et al. |
| 2002/0077833 A1 | 6/2002 | Arons et al. |

(Continued)

OTHER PUBLICATIONS

Non-Final Office Action from U.S. Appl. No. 17/363,883, mailed Oct. 26, 2023, 15 pages.

(Continued)

*Primary Examiner* — George C Monikang
(74) *Attorney, Agent, or Firm* — Polsinelli PC

(57) ABSTRACT

A content management system obtains at least a portion of a meeting transcript based on an audio stream of a meeting attended by a plurality of users, the meeting transcript obtained in an ongoing manner as words are uttered during the meeting. The content management system detects text entered by a user of the plurality of users into a content item during the meeting. The content management system matches the detected text to at least part of the at least the portion of the meeting transcript. The content management system provides the at least part of the at least the portion of the meeting transcript to the user as a suggested subsequent text.

20 Claims, 10 Drawing Sheets

(56) References Cited

U.S. PATENT DOCUMENTS

2018/0197548 A1    7/2018    Palakodety et al.
2020/0403817 A1    12/2020    Daredia et al.
2020/0410453 A1    12/2020    Nalliah et al.

OTHER PUBLICATIONS

Notice of Allowance from U.S. Appl. No. 17/363,883, mailed on Feb. 1, 2024, 9 pages.

Hain T., et al., "The AMI Meeting Transcription System : Progress and Performance," Machine Learning for Multimodal Interaction, Third International Workshop, MLMI 2006. Revised Selected Papers (Lecture Notes in Computer Science, retrieved from https://www.engineeringvillage.com/search/doc/abstract.url?&pageType=quickSearch&usageZone=resultslist&usageOrigin=searchresults&searchtype=Quick&SEARCHID=a3c1e8f7fcf84accafee0662e1370530&DOCINDEX=1&ignore_docid=inspec_13f30451104a724f82M53fd2061377553&database=135&format=quickSearchAbstractFormat&tagscope=&displayPagination=yes , vol. 4299, 2006, 12 pages.

MACHINE LEARNING RECOMMENDATION ENGINE FOR CONTENT ITEM DATA ENTRY BASED ON MEETING MOMENTS AND PARTICIPANT ACTIVITY

CROSS REFERENCE TO RELATED APPLICATIONS

This application is a continuation of U.S. application Ser. No. 17/363,883, filed Jun. 30, 2021, which is incorporated by reference in its entirety.

TECHNICAL FIELD

The disclosed embodiments generally relate to computer-assisted note taking, and particularly to a content management system that predicts text for a document based on a transcript using machine learning.

BACKGROUND

It is common for one or more attendees of a meeting to take notes during the meeting. Notes entered into a content item, such as a text document, by an attendee of the meeting often correspond to words spoken during the meeting. Entering notes into the content item as the meeting progresses can be difficult due to the rate at which information is conveyed during the meeting.

Machine learning techniques can be used for natural language processing, such as to convert audio data into a text document. However, simple transcription of a meeting can be insufficient for the purpose of note taking, as the transcription may include significant amounts of text unimportant to the note taker, e.g., text unrelated to a purpose of the meeting. Moreover, such models are noisy, as they are trained on generic data that is not tuned to subjective preferences of meeting attendees.

SUMMARY

Systems and methods are disclosed herein for a content management system that obtains at least a portion of a meeting transcript based on an audio stream of a meeting attended by a plurality of users. The meeting transcript is obtained in an ongoing manner as words are uttered during the meeting. The content management system detects text entered by a user into a content item during the meeting (e.g., as the user takes notes). The content management system matches the detected text to at least part of the portion of the meeting transcript. The content management system provides at least part of the portion of the meeting transcript to the user as a suggested subsequent text (e.g., for entry into the user's notes).

Contextualizing the relative relevance or importance of utterances in audio data such that a machine learning model can transcribe more relevant or important utterances (e.g., those with at least a threshold score assigned by the model) and not transcribe less relevant or important utterances (e.g., those with less than a threshold score assigned by the model) is difficult due to the imprecise and volatile nature of qualities such as relevance and importance. This is exacerbated by the difficulty in procuring training data for the machine learning model, where significant time and resources would be needed to produce labeled transcripts indicating the relevance or importance of utterances in the transcripts. The systems and methods disclosed herein provide various technical advantages, including solutions to these technical difficulties. For example, the systems and methods disclosed herein provide for machine learning-assisted note taking, enabling the production of meeting notes that have fewer recordation errors and are more compact with less redundant or irrelevant features than a simple autogenerated meeting transcript.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Overview

Figure 1:
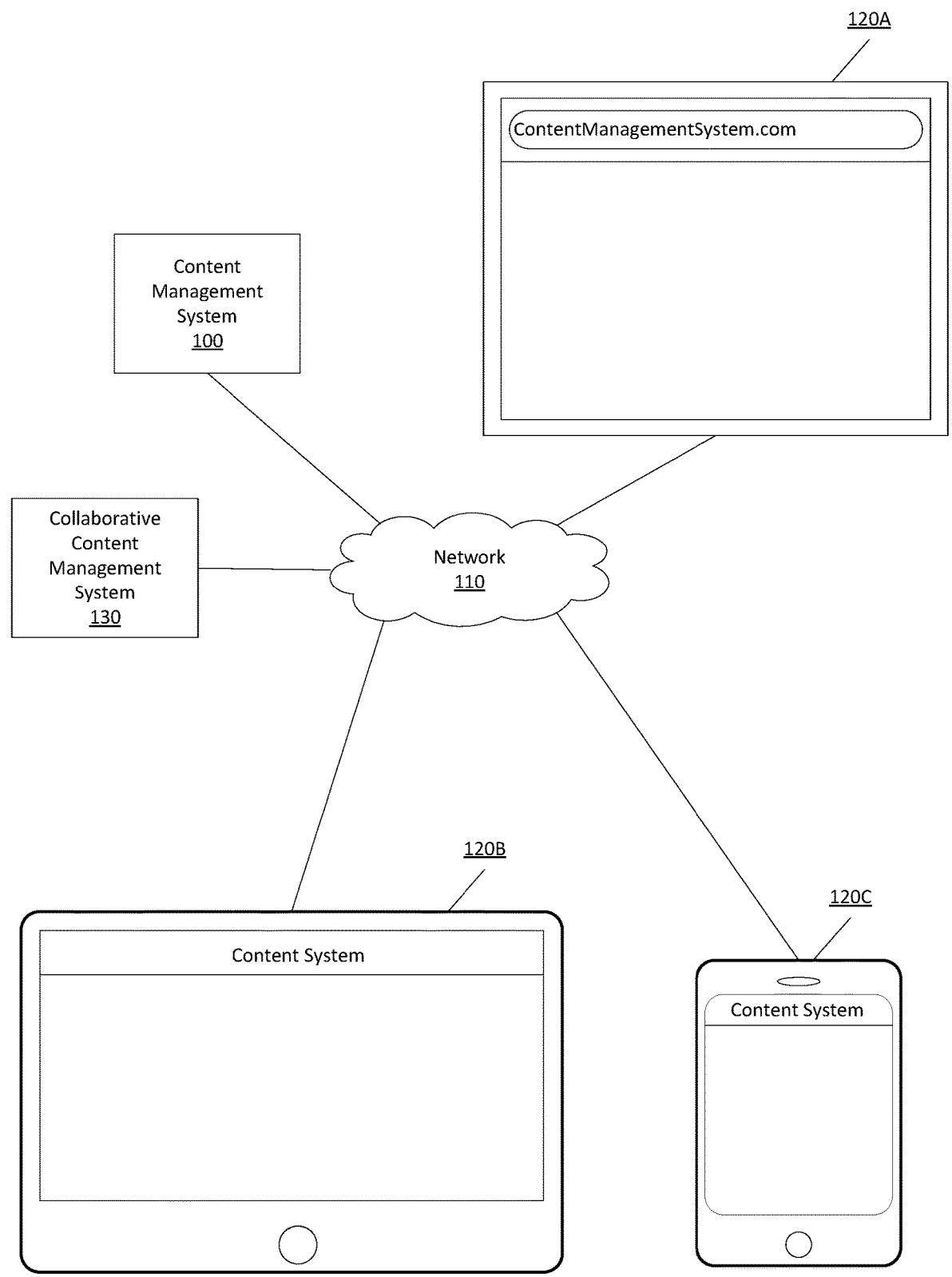
FIG. 1 shows a diagram of a system environment of a content management system and a collaborative content management system according to one embodiment.

FIG. 1 shows a system environment including content management system 100, collaborative content management system 130, and client devices 120a, 120b, and 120c (collectively or individually "120"). Content management system 100 provides functionality for sharing content items with one or more client devices 120 and synchronizing content items between content management system 100 and one or more client devices 120.

The content stored by content management system 100 can include any type of content items, such as documents, spreadsheets, collaborative content items, text files, audio files, image files, video files, webpages, executable files, binary files, placeholder files that reference other content items, etc. In some implementations, a content item can be a portion of another content item, such as an image that is included in a document. Content items can also include collections, such as folders, namespaces, playlists, albums, etc., that group other content items together. The content stored by content management system 100 may be organized in one configuration in folders, tables, or in other database structures (e.g., object oriented, key/value etc.).

In one embodiment, the content stored by content management system 100 includes content items created by using third party applications, e.g., word processors, video and image editors, database management systems, spreadsheet applications, code editors, and so forth, which are independent of content management system 100.

In some embodiments, content stored by content management system 100 includes content items, e.g., collaborative content items, created using a collaborative interface provided by collaborative content management system 130. In various implementations, collaborative content items can be stored by collaborative content item management system 130, with content management system 100, or external to content management system 100. A collaborative interface can provide an interactive content item collaborative platform whereby multiple users can simultaneously create and edit collaborative content items, comment in the collaborative content items, and manage tasks within the collaborative content items.

Users may create accounts at content management system 100 and store content thereon by sending such content from client device 120 to content management system 100. The content can be provided by users and associated with user accounts that may have various privileges. For example, privileges can include permissions to: see content item titles, see other metadata for the content item (e.g. location data, access history, version history, creation/modification dates, comments, file hierarchies, etc.), read content item contents, modify content item metadata, modify content of a content item, comment on a content item, read comments by others on a content item, or grant or remove content item permissions for other users.

Client devices 120 communicate with content management system 100 and collaborative content management system 130 through network 110. The network may be any suitable communications network for data transmission. In one embodiment, network 110 is the Internet and uses standard communications technologies and/or protocols. Thus, network 110 can include links using technologies such as Ethernet, 802.11, worldwide interoperability for microwave access (WiMAX), 3G, 4G, digital subscriber line (DSL), asynchronous transfer mode (ATM), InfiniBand, PCI Express Advanced Switching, etc. Similarly, the networking protocols used on network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over network 110 can be represented using technologies and/or formats including the hypertext markup language (HTML), the extensible markup language (XML), JavaScript Object Notation (JSON), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

In some embodiments, content management system 100 and collaborative content management system 130 are combined into a single system. The system may include one or more servers configured to provide the functionality discussed herein for the systems 100 and 130.

Client Device

Figure 2:
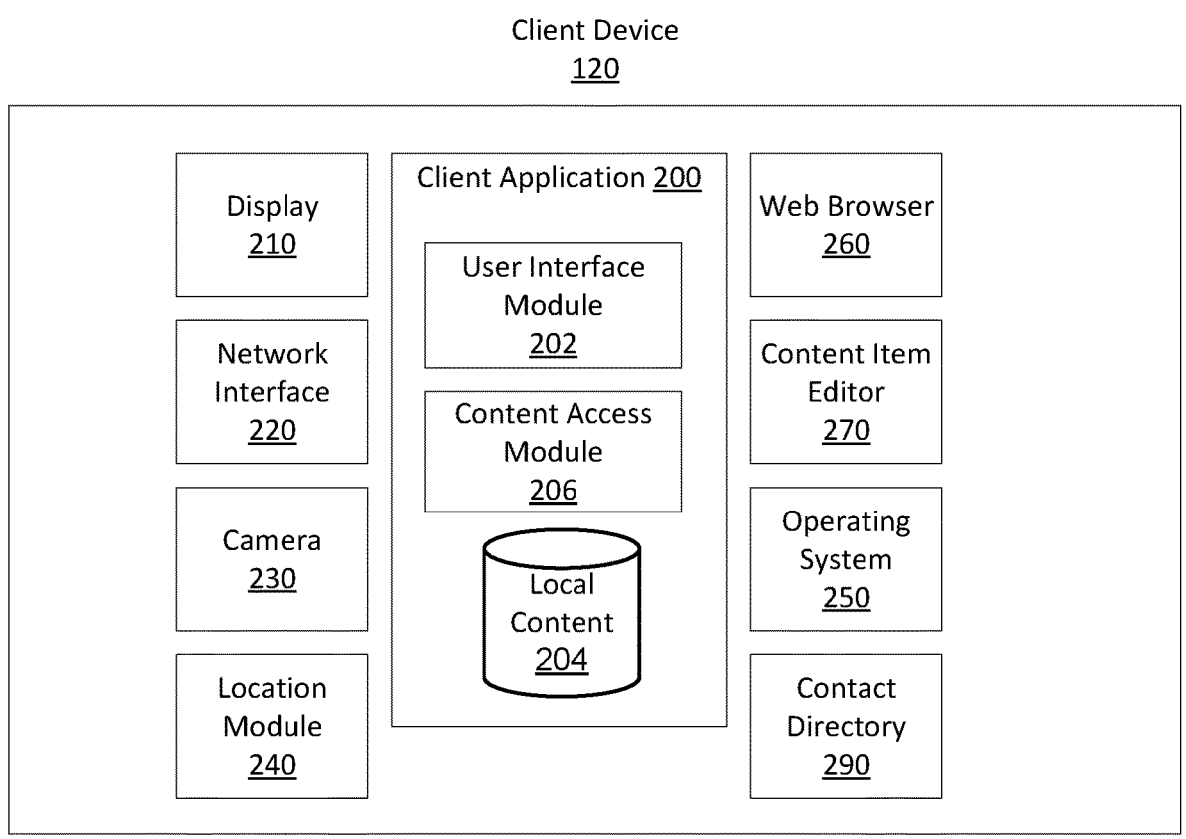
FIG. 2 shows a block diagram of components of a client device, according to one example embodiment.

FIG. 2 shows a block diagram of the components of a client device 120 according to one embodiment. Client devices 120 generally include devices and modules for communicating with content management system 100 and a user of client device 120. Client device 120 includes display 210 for providing information to the user, and in certain client devices 120 includes a touchscreen. Client device 120 also includes network interface 220 for communicating with content management system 100 via network 110. There are additional components that may be included in client device 120 but that are not shown, for example, one or more computer processors, local fixed memory (RAM and ROM), as well as optionally removable memory (e.g., SD-card), power sources, and audio-video outputs.

In certain embodiments, client device 120 includes additional components such as camera 230 and location module 240. Location module 240 determines the location of client device 120, using, for example, a global positioning satellite signal, cellular tower triangulation, or other methods. Location module 240 may be used by client application 200 to obtain location data and add the location data to metadata about a content item.

Client devices 120 maintain various types of components and modules for operating the client device and accessing content management system 100. The software modules can include operating system 250 or a collaborative content item editor 270. Collaborative content item editor 270 is configured for creating, viewing and modifying collaborative content items such as text documents, code files, mixed media files (e.g., text and graphics), presentations or the like. Operating system 250 on each device provides a local file management system and executes the various software modules such as content management system client application 200 and collaborative content item editor 270. A contact directory 290 stores information on the user's contacts, such as name, telephone numbers, company, email addresses, physical address, website URLs, and the like.

Client devices 120 access content management system 100 and collaborative content management system 130 in a variety of ways. Client device 120 may access these systems through a native application or software module, such as content management system client application 200. Client device 120 may also access content management system 100 through web browser 260. As an alternative, the client application 200 may integrate access to content management system 100 with the local file management system provided by operating system 250. When access to content management system 100 is integrated in the local file management system, a file organization scheme maintained at the content management system is represented at the client device 120 as a local file structure by operating system 250 in conjunction with client application 200.

Client application 200 manages access to content management system 100 and collaborative content management system 130. Client application 200 includes user interface module 202 that generates an interface to the content accessed by client application 200 and is one means for performing this function. The generated interface is provided to the user by display 210. Client application 200 may store content accessed from a content storage at content management system 100 in local content 204. While represented here as within client application 200, local content 204 may be stored with other data for client device 120 in non-volatile storage. When local content 204 is stored this way, the content is available to the user and other applications or modules, such as collaborative content item editor 270, when client application 200 is not in communication with content management system 100. Content access module 206 manages updates to local content 204 and communicates with content management system 100 to synchronize content modified by client device 120 with content maintained on content management system 100, and is one means for performing this function. Client application 200 may take various forms, such as a stand-alone application, an application plug-in, or a browser extension.

Content Management System

Figure 3:
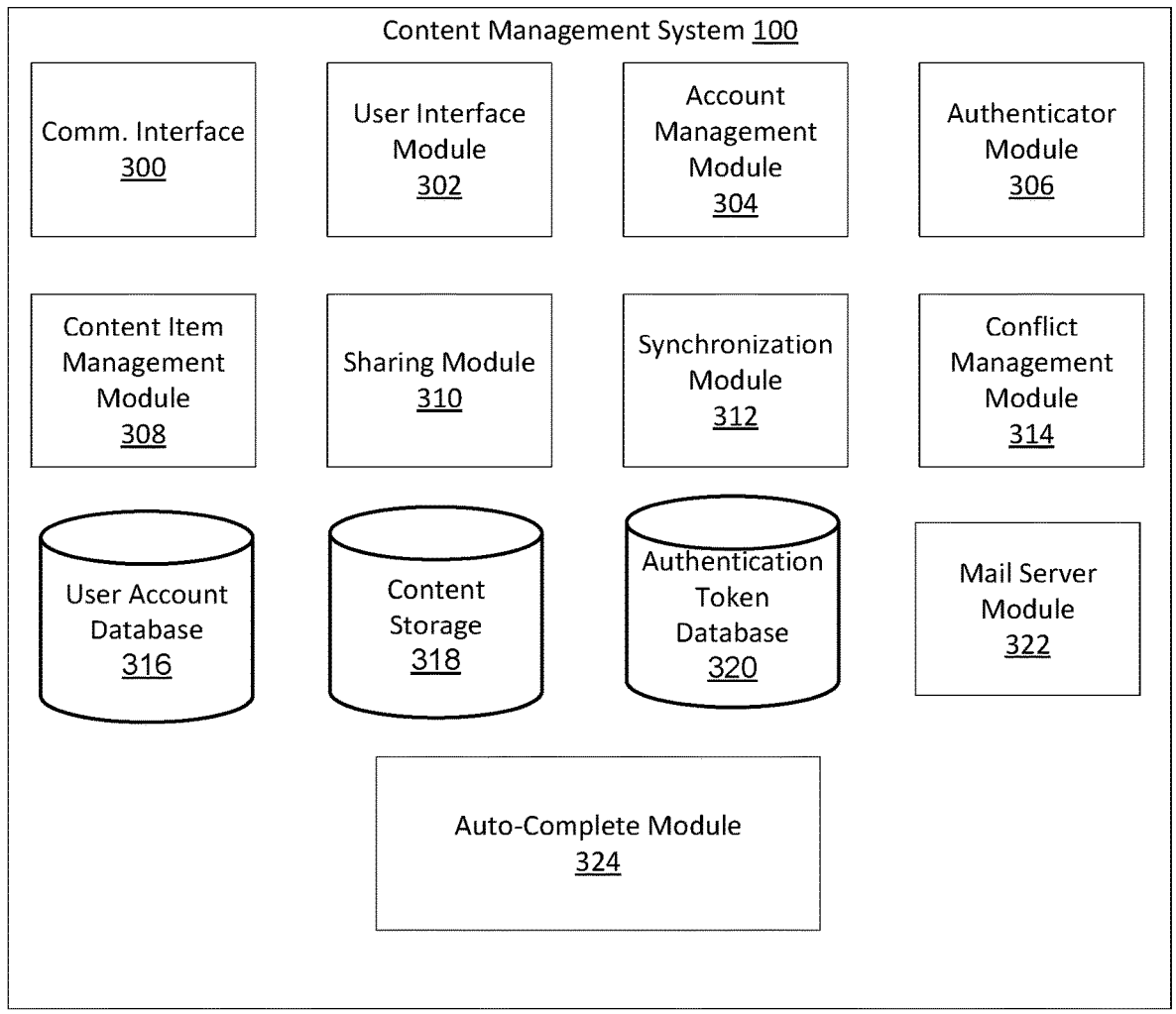
FIG. 3 shows a block diagram of a content management system, according to one example embodiment.

FIG. 3 shows a block diagram of the content management system 100 according to one embodiment. To facilitate the various content management services, a user can create an account with content management system 100. The account information can be maintained in user account database 316, and is one means for performing this function. User account database 316 can store profile information for registered users. In some cases, the only personal information in the user profile is a username and/or email address. However, content management system 100 can also be configured to accept additional user information, such as password recovery information, demographics information, payment information, and other details. Each user is associated with a userID and a username. For purposes of convenience, references herein to information such as collaborative content items or other data being "associated" with a user are understood to mean an association between a collaborative content item and either of the above forms of user identifier for the user. Similarly, data processing operations on collaborative content items and users are understood to be operations performed on derivative identifiers such as collaborativeContentItemID and userIDs. For example, a user may be associated with a collaborative content item by storing the information linking the userID and the collaborativeContentItemID in a table, file, or other storage formats. For example, a database table organized by collaborativeContentItemIDs can include a column listing the userID of each user associated with the collaborative content item. As another example, for each userID, a file can list a set of collaborativeContentItemID associated with the user. As another example, a single file can list key values pairs such as <userID, collaborativeContentItemID> representing the association between an individual user and a collaborative content item. The same types of mechanisms can be used to associate users with comments, threads, text elements, formatting attributes, and the like.

User account database 316 can also include account management information, such as account type, e.g. free or paid; usage information for each user, e.g., file usage history; maximum storage space authorized; storage space used; content storage locations; security settings; personal configuration settings; content sharing data; etc. Account management module 304 can be configured to update and/or obtain user account details in user account database 316. Account management module 304 can be configured to interact with any number of other modules in content management system 100.

An account can be used to store content items, such as collaborative content items, audio files, video files, etc., from one or more client devices associated with the account. Content items can be shared with multiple users and/or user accounts. In some implementations, sharing a content item can include associating, using sharing module 310, the content item with two or more user accounts and providing for user permissions so that a user that has authenticated into one of the associated user accounts has a specified level of access to the content item. That is, the content items can be shared across multiple client devices of varying type, capabilities, operating systems, etc. The content items can also be shared across varying types of user accounts.

Individual users can be assigned different access privileges to a content item shared with them, as discussed above. In some cases, a user's permissions for a content item can be explicitly set for that user. A user's permissions can also be set based on: a type or category associated with the user (e.g., elevated permissions for administrator users or manager), the user's inclusion in a group or being identified as part of an organization (e.g., specified permissions for all members of a particular team), and/or a mechanism or context of a user's accesses to a content item (e.g., different permissions based on where the user is, what network the user is on, what type of program or API the user is accessing, whether the user clicked a link to the content item, etc.). Additionally, permissions can be set by default for users, user types/groups, or for various access mechanisms and contexts.

In some implementations, shared content items can be accessible to a recipient user without requiring authentication into a user account. This can include sharing module 310 providing access to a content item through activation of a link associated with the content item or providing access through a globally accessible shared folder.

The content can be stored in content storage 318, which is one means for performing this function. Content storage 318 can be a storage device, multiple storage devices, or a server. Alternatively, content storage 318 can be a cloud storage provider or network storage accessible via one or more communications networks. The cloud storage provider or network storage may be owned and managed by the content management system 100 or by a third party. In one configuration, content management system 100 stores the content items in the same organizational structure as they appear on the client device. However, content management system 100 can store the content items in its own order, arrangement, or hierarchy.

Content storage 318 can also store metadata describing content items, content item types, and the relationship of content items to various accounts, folders, or groups. The metadata for a content item can be stored as part of the content item or can be stored separately. In one configuration, each content item stored in content storage 318 can be assigned a system-wide unique identifier.

In one embodiment, content storage 318 may be a distributed system that stores data as key-value pairs in tables distributed across multiple nodes, where a node may be a system or a device (such as a computer or a server) that stores a portion of the data. In one embodiment, a data table (or table) is a collection of key-value pairs (may also be referred to as entries) that are stored in one node or distributed across multiple nodes. A set of related tables may be grouped as a family of tables.

Content storage 318 can decrease the amount of storage space required by identifying duplicate files or duplicate segments of files. Instead of storing multiple copies of an identical content item, content storage 318 can store a single copy and then use a pointer or other mechanism to link the duplicates to the single copy. Similarly, content storage 318 stores files using a file version control mechanism that tracks changes to files, different versions of files (such as a diverging version tree), and a change history. The change history can include a set of changes that, when applied to the original file version, produces the changed file version.

Content storage 318 may further decrease the amount of storage space required by deleting content items based on expiration time of the content items. An expiration time for a content item may indicate that the content item is no longer needed after the expiration time and may therefore be deleted. Content storage 318 may periodically scan through the content items and compare expiration time with current time. If the expiration time of a content item is earlier than the current time, content storage 318 may delete the content item from content storage 318.

Content management system 100 automatically synchronizes content from one or more client devices, using synchronization module 312, which is one means for performing this function. The synchronization is platform agnostic. That is, the content is synchronized across multiple client devices 120 of varying type, capabilities, operating systems, etc. For example, client application 200 synchronizes, via synchronization module 312 at content management system 100, content in client device 120's file system with the content in an associated user account on system 100. Client application 200 synchronizes any changes to content in a designated folder and its sub-folders with the synchronization module 312. Such changes include new, deleted, modified, copied, or moved files or folders. Synchronization module 312 also provides any changes to content associated with client device 120 to client application 200. This synchronizes the local content at client device 120 with the content items at content management system 100.

Conflict management module 314 determines whether there are any discrepancies between versions of a content item located at different client devices 120. For example, when a content item is modified at one client device and a second client device, differing versions of the content item may exist at each client device. Synchronization module 312 determines such versioning conflicts, for example by identifying the modification time of the content item modifications. Conflict management module 314 resolves the conflict between versions by any suitable means, such as by merging the versions, or by notifying the client device of the later-submitted version.

A user can also view or manipulate content via a web interface generated by user interface module 302. For example, the user can navigate in web browser 260 to a web address provided by content management system 100. Changes or updates to content in content storage 318 made through the web interface, such as uploading a new version of a file, are synchronized back to other client devices 120 associated with the user's account. Multiple client devices 120 may be associated with a single account and files in the account are synchronized between each of the multiple client devices 120.

Content management system 100 includes communications interface 300 for interfacing with various client devices 120, and with other content and/or service providers via an Application Programming Interface (API), which is one means for performing this function. Certain software applications access content storage 318 via an API on behalf of a user. For example, a software package, such as an app on a smartphone or tablet computing device, can programmatically make calls directly to content management system 100, when a user provides credentials, to read, write, create, delete, share, or otherwise manipulate content. Similarly, the API can allow users to access all or part of content storage 318 through a web site.

Content management system 100 can also include authenticator module 306, which verifies user credentials, security tokens, API calls, specific client devices, etc., to determine whether access to requested content items is authorized, and is one means for performing this function. Authenticator module 306 can generate one-time use authentication tokens for a user account. Authenticator module 306 assigns an expiration period or date to each authentication token. In addition to sending the authentication tokens to requesting client devices, authenticator module 306 can store generated authentication tokens in authentication token database 320. After receiving a request to validate an authentication token, authenticator module 306 checks authentication token database 320 for a matching authentication token assigned to the user. Once the authenticator module 306 identifies a matching authentication token, authenticator module 306 determines if the matching authentication token is still valid. For example, authenticator module 306 verifies that the authentication token has not expired or was not marked as used or invalid. After validating an authentication token, authenticator module 306 may invalidate the matching authentication token, such as a single-use token. For example, authenticator module 306 can mark the matching authentication token as used or invalid, or delete the matching authentication token from authentication token database 320.

In some embodiments, content management system 100 includes a content item management module 308 for maintaining a content directory that identifies the location of each content item in content storage 318, and allows client applications to request access to content items in the storage 318, and which is one means for performing this function. A content entry in the content directory can also include a content pointer that identifies the location of the content item in content storage 318. For example, the content entry can include a content pointer designating the storage address of the content item in memory. In some embodiments, the content entry includes multiple content pointers that point to multiple locations, each of which contains a portion of the content item.

In addition to a content path and content pointer, a content entry in some configurations also includes user account identifier that identifies the user account that has access to the content item. In some embodiments, multiple user account identifiers can be associated with a single content entry indicating that the content item has shared access by the multiple user accounts.

In some embodiments, the content management system 100 can include a mail server module 322. The mail server module 322 can send (and receive) collaborative content items to (and from) other client devices using the collaborative content management system 100. The mail server module can also be used to send and receive messages between users in the content management system.

Content management system 100 additionally includes auto-complete module 324. Auto-complete module 324 suggests subsequent texts to a user typing into content items based on a meeting transcript (e.g., of a meeting the user is attending). The auto-complete module 324 is described in further detail below with reference to FIG. 5. Although described herein with reference to content items, the techniques put forth herein also apply to collaborative content items.

Collaborative Content Management System

Figure 4:
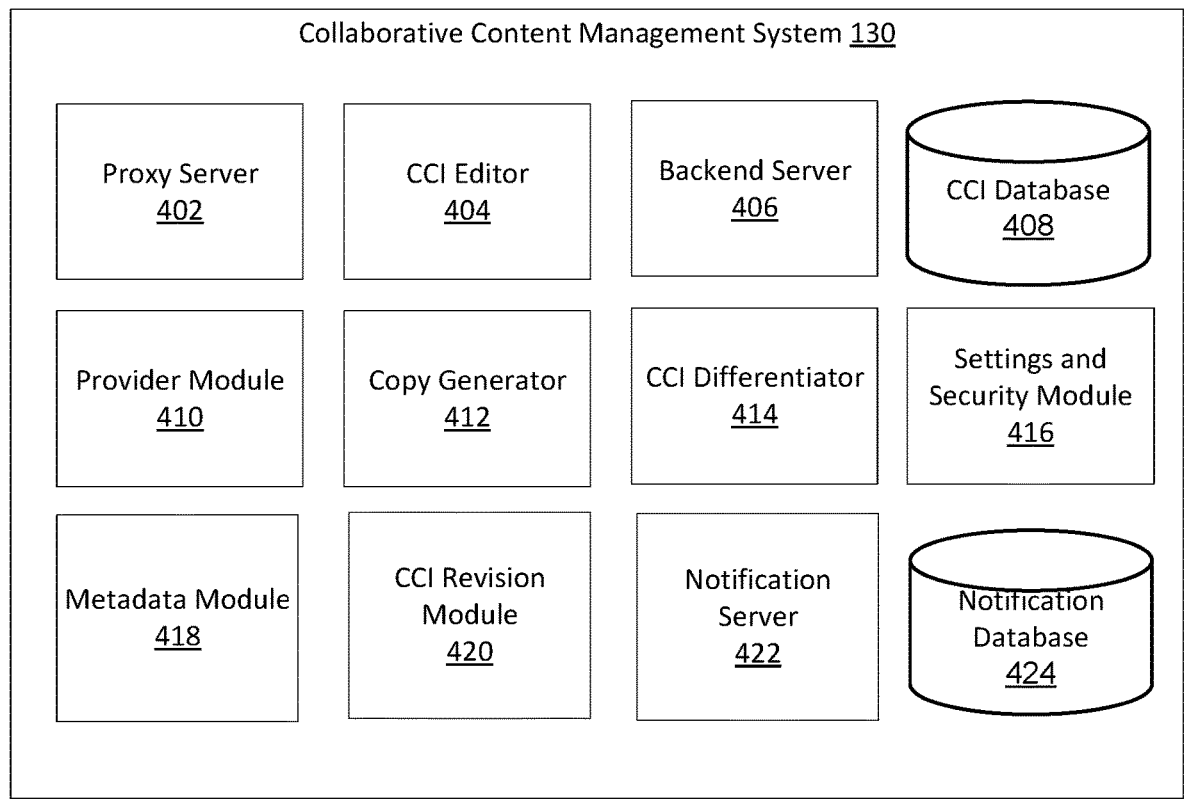
FIG. 4 shows a block diagram of a collaborative content management system, according to one example embodiment.

FIG. 4 shows a block diagram of the collaborative content management system 130, according to one embodiment. Collaborative content items can be files that users can create and edit using a collaborative content items editor 270 and can contain collaborative content item elements. Collaborative content item elements may include any type of content such as text; images, animations, videos, audio, or other multi-media; tables; lists; references to external content; programming code; tasks; tags or labels; comments; or any other type of content. Collaborative content item elements can be associated with an author identifier, attributes, interaction information, comments, sharing users, etc. Collaborative content item elements can be stored as database entities, which allows for searching and retrieving the collaborative content items. As with other types of content items, collaborative content items may be shared and synchronized with multiple users and client devices 120, using sharing 310 and synchronization 312 modules of content management system 100. Users operate client devices 120 to create and edit collaborative content items, and to share collaborative content items with other users of client devices 120. Changes to a collaborative content item by one client device 120 are propagated to other client devices 120 of users associated with that collaborative content item.

In the embodiment of FIG. 1, collaborative content management system 130 is shown as separate from content management system 100 and can communicate with it to obtain its services. In other embodiments, collaborative content management system 130 is a subsystem of the component of content management system 100 that provides sharing and collaborative services for various types of content items. User account database 316 and authentication token database 320 from content management system 100 are used for accessing collaborative content management system 130 described herein.

Collaborative content management system 130 can include various servers for managing access and edits to collaborative content items and for managing notifications about certain changes made to collaborative content items. Collaborative content management system 130 can include proxy server 402, collaborative content item editor 404, backend server 406, and collaborative content item database 408, access link module 410, copy generator 412, collaborative content item differentiator 414, settings module 416, metadata module 418, revision module 420, notification server 422, and notification database 424. Proxy server 402 handles requests from client applications 200 and passes those requests to the collaborative content item editor 404. Collaborative content item editor 404 manages application level requests for client applications 200 for editing and creating collaborative content items, and selectively interacts with backend servers 406 for processing lower level processing tasks on collaborative content items, and interfacing with collaborative content items database 408 as needed. Collaborative content items database 408 contains a plurality of database objects representing collaborative content items, comment threads, and comments. Each of the database objects can be associated with a content pointer indicating the location of each object within the CCI database 408. Notification server 422 detects actions performed on collaborative content items that trigger notifications, creates notifications in notification database 424, and sends notifications to client devices.

Client application 200 sends a request relating to a collaborative content item to proxy server 402. Generally, a request indicates the userID ("UID") of the user, and the collaborativeContentItemID ("NID") of the collaborative content item, and additional contextual information as appropriate, such as the text of the collaborative content item. When proxy server 402 receives the request, the proxy server 402 passes the request to the collaborative content item editor 404. Proxy server 402 also returns a reference to the identified collaborative content items proxy server 402 to client application 200, so the client application can directly communicate with the collaborative content item editor 404 for future requests. In an alternative embodiment, client application 200 initially communicates directly with a specific collaborative content item editor 404 assigned to the userID.

When collaborative content item editor 404 receives a request, it determines whether the request can be executed directly or by a backend server 406. When the request adds, edits, or otherwise modifies a collaborative content item the request is handled by the collaborative content item editor 404. If the request is directed to a database or index inquiry, the request is executed by a backend server 406. For example, a request from client device 120 to view a collaborative content item or obtain a list of collaborative content items responsive to a search term is processed by backend server 406.

The access module 410 receives a request to provide a collaborative content item to a client device. In one embodiment, the access module generates an access link to the collaborative content item, for instance in response to a request to share the collaborative content item by an author. The access link can be a hyperlink including or associated with the identification information of the CCI (i.e., unique identifier, content pointer, etc.). The hyperlink can also include any type of relevant metadata within the content management system (i.e., author, recipient, time created, etc.). In one embodiment, the access module can also provide the access link to user accounts via the network 110, while in other embodiments the access link can be provided or made accessible to a user account and is accessed through a user account via the client device. In one embodiment, the access link will be a hyperlink to a landing page (e.g., a webpage, a digital store front, an application login, etc.) and activating the hyperlink opens the landing page on a client device. The landing page can allow client devices not associated with a user account to create a user account and access the collaborative content item using the identification information associated with the access link. Additionally, the access link module can insert metadata into the collaborative content item, associate metadata with the collaborative content item, or access metadata associated with the collaborative content item that is requested.

The access module 410 can also provide collaborative content items via other methods. For example, the access module 410 can directly send a collaborative content item to a client device or user account, store a collaborative content item in a database accessible to the client device, interact with any module of the collaborative content management system to provide modified versions of collaborative content items (e.g., the copy generator 412, the CCI differentiator 414, etc.), sending content pointer associated with the collaborative content item, sending metadata associated with the collaborative content item, or any other method of providing collaborative content items between devices in the network. The access module can also provide collaborative content items via a search of the collaborative content item database (i.e., search by a keyword associated with the collaborative content item, the title, or a metadata tag, etc.).

The copy generator 412 can duplicate a collaborative content item. Generally, the copy generator duplicates a collaborative content item when a client device selects an access link associated with the collaborative content item. The copy generator 412 accesses the collaborative content item associated with the access link and creates a derivative copy of the collaborative content item for every request received. The copy generator 412 stores each derivative copy of the collaborative content item in the collaborative content item database 408. Generally, each copy of the collaborative content item that is generated by the copy generator 412 is associated with both the client device from which the request was received and the user account associated with the client device requesting the copy. When the copy of the collaborative content item is generated it can create a new unique identifier and content pointer for the copy of the collaborative content item. Additionally, the copy generator 412 can insert metadata into the collaborative content item, associate metadata with the copied collaborative content item, or access metadata associated with the collaborative content item that was requested to be copied.

The collaborative content item differentiator 414 determines the difference between two collaborative content items. In one embodiment, the collaborative content item differentiator 414 determines the difference between two collaborative content items when a client device selects an access hyperlink and accesses a collaborative content item that the client device has previously used the copy generator 412 to create a derivative copy. The content item differentiator can indicate the differences between the content elements of the compared collaborative content items. The collaborative content item differentiator 414 can create a collaborative content item that includes the differences between the two collaborative content items, i.e. a differential collaborative content item. In some embodiments, the collaborative content item differentiator provides the differential collaborative content item to a requesting client device 120. The differentiator 414 can store the differential collaborative content item in the collaborative content item database 408 and generate identification information for the differential collaborative content item. Additionally, the differentiator 414 can insert metadata into the accessed and created collaborative content items, associate metadata with the accessed and created collaborative content item, or access metadata associated with the collaborative content items that were requested to be differentiated.

The settings and security module 416 can manage security during interactions between client devices 120, the content management system 100, and the collaborative content management system 130. Additionally, the settings and security module 416 can manage security during interactions between modules of the collaborative content management system. For example, when a client device 120 attempts to interact within any module of the collaborative content management system 100, the settings and security module 416 can manage the interaction by limiting or disallowing the interaction. Similarly, the settings and security module 416 can limit or disallow interactions between modules of the collaborative content management system 130. Generally, the settings and security module 416 accesses metadata associated with the modules, systems 100 and 130, devices 120, user accounts, and collaborative content items to determine the security actions to take. Security actions can include: requiring authentication of client devices 120 and user accounts, requiring passwords for content items, removing metadata from collaborative content items, preventing collaborative content items from being edited, revised, saved or copied, or any other security similar security action. Additionally, settings and security module can access, add, edit or delete any type of metadata associated with any element of content management system 100, collaborative content management system 130, client devices 120, or collaborative content items.

The metadata module 418 manages metadata within with the collaborative content management system. Generally, metadata can take three forms within the collaborative content management system: internal metadata, external metadata, and device metadata. Internal metadata is metadata within a collaborative content item, external metadata is metadata associated with a CCI but not included or stored within the CCI itself, and device metadata is associated with client devices. At any point the metadata module can manage metadata by changing, adding, or removing metadata.

Some examples of internal metadata can be: identifying information within collaborative content items (e.g., email addresses, names, addresses, phone numbers, social security numbers, account or credit card numbers, etc.); metadata associated with content elements (e.g., location, time created, content element type; content element size; content element duration, etc.); comments associated with content elements (e.g., a comment giving the definition of a word in a collaborative content item and its attribution to the user account that made the comment); or any other metadata that can be contained within a collaborative content item.

Some examples of external metadata can be: content tags indicating categories for the metadata; user accounts associated with a CCI (e.g., author user account, editing user account, accessing user account etc.); historical information (e.g., previous versions, access times, edit times, author times, etc.); security settings; identifying information (e.g., unique identifier, content pointer); collaborative content management system 130 settings; user account settings; or any other metadata that can be associated with the collaborative content item.

Some examples of device metadata can be: device type; device connectivity; device size; device functionality; device sound and display settings; device location; user accounts associated with the device; device security settings; or any other type of metadata that can be associated with a client device 120.

The collaborative content item revision module 420 manages application level requests for client applications 200 for revising differential collaborative content items and selectively interacts with backend servers 406 for processing lower level processing tasks on collaborative content items, and interfacing with collaborative content items database 408 as needed. The revision module can create a revised collaborative content item that is some combination of the content elements from the differential collaborative content item. The revision module 420 can store the revised collaborative content item in the collaborative content item database or provide the revised collaborative content item to a client device 120. Additionally, the revision module 420 can insert metadata into the accessed and created collaborative content items, associate metadata with the accessed and created collaborative content item, or access metadata associated with the collaborative content items that were requested to be differentiated.

Content management system 100 and collaborative content management system 130 may be implemented using a single computer, or a network of computers, including cloud-based computer implementations. The operations of content management system 100 and collaborative content management system 130 as described herein can be controlled through either hardware or through computer programs installed in computer storage and executed by the processors of such server to perform the functions described herein. These systems include other hardware elements necessary for the operations described here, including network interfaces and protocols, input devices for data entry, and output devices for display, printing, or other presentations of data, but which are not described herein. Similarly, conventional elements, such as firewalls, load balancers, collaborative content items servers, failover servers, network management tools and so forth are not shown so as not to obscure the features of the system. Finally, the functions and operations of content management system 100 and collaborative content management system 130 are sufficiently complex as to require implementation on a computer system, and cannot be performed in the human mind simply by mental steps.

Content Item Management Module

Figure 5:
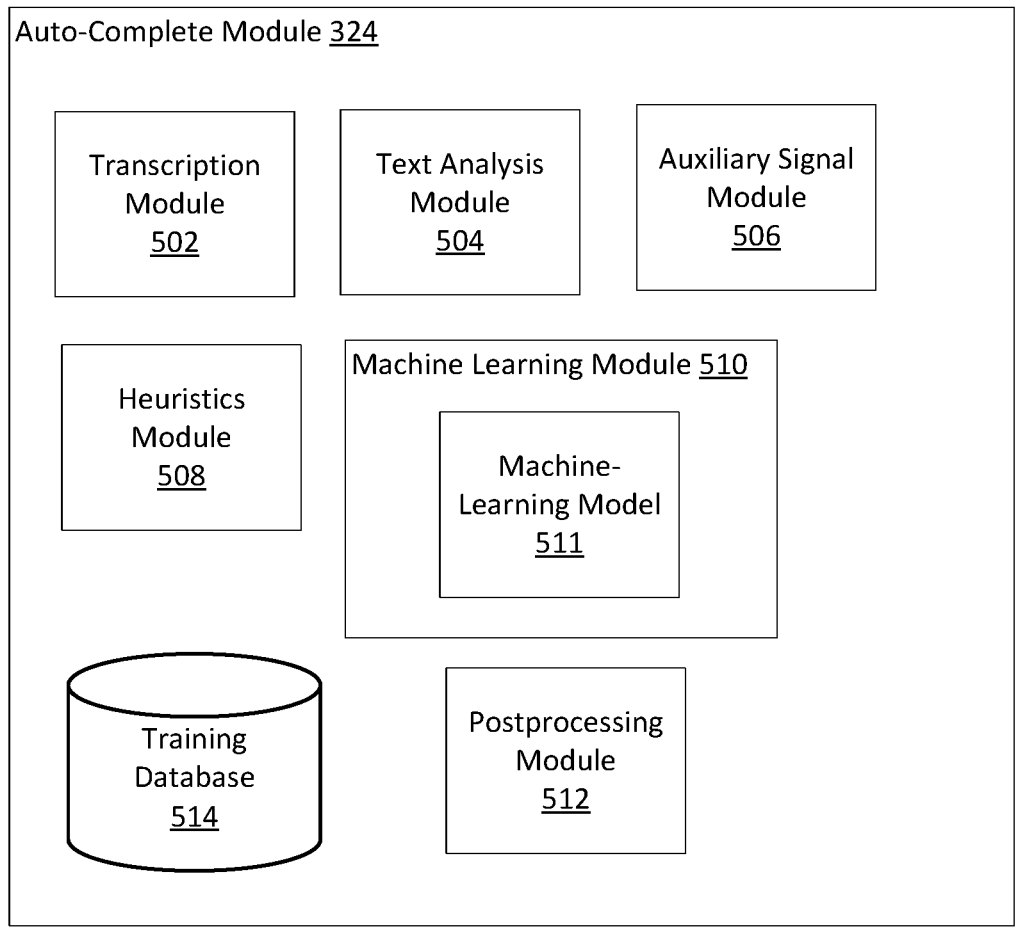
FIG. 5 shows a block diagram of an auto-complete module in a content management system, according to one example embodiment.

FIG. 5 shows a block diagram of an auto-complete module 324 in a content management system, according to one example embodiment. The auto-complete module 324 generates suggested subsequent texts for detected text in content items. The auto-complete module may generate a suggested subsequent text for detected text from one user, or may generate different suggested subsequent texts in parallel for a plurality of users, either for the same content item or for different content items. The auto-complete module 324 includes a transcription module 502, a text analysis module 504, an auxiliary signal module 506, a heuristics module 508, a machine learning module 510, a postprocessing module 512, and a training database 514.

The transcription module 502 orchestrates transcription of one or more audio streams as words are uttered in the audio streams. The transcription module 502 sends the one or more audio streams to a transcription engine and receives one or more respective transcripts from the transcription engine. Each received transcript is a portion of a full transcription of the audio stream, e.g., a transcription of a particular quantity of the audio stream, such as audio data from a most recent one second time period. Each transcript may include timestamps indicating times at which each word in the transcript was uttered, and can include indications of which user spoke (which may be determined based off the client device 120 from which the audio data including the utterance was received).

The transcription engine is either a local system upon the content management system 100 or a remote entity to which the one or more audio streams are sent, e.g., to an endpoint exposed by an application programming interface (API) of the remote entity. Alternatively, a hybrid approach involving a local system and a remote entity may be employed. The transcription module 502 passes the one or more transcripts to the text analysis module 504 either as they are received or periodically.

The text analysis module 504 indexes the transcripts for referencing against detected text. The index may be a Markov model constructed by the text analysis module 504 and updated as additional transcripts are received from the transcription module 502. Alternatively, the index may be another data structure. In an embodiment, the text analysis module 504 may divide the text in the index according to one or more factors, such as a change of speaker, a gap in time between utterances, a maximum number of words for one division of text in the index, or so on. In an embodiment, the index is a single-level map, where all of the keys are pairs of words. Alternative embodiments may include a prefix tree with variable length prefixes (e.g., detected text).

The text analysis module 504 also receives detected text from a content item editor 270 or detects text in an active content item at the content item editor 270 that matches one or more auto-complete parameters. The text analysis module 504 checks text from the content item editor 270 against the one or more auto-complete parameters to determine whether the text qualifies for transcription-based autocomplete. For example, the auto-complete parameter may be that the detected text includes a predefined number of (e.g., pair of) adjacent words typed within a threshold amount of time of entry from one another. The one or more auto-complete parameters may alternatively or additionally include a minimum number of characters in the detected text (e.g., a minimum of four characters). The auto-complete parameter being that the detected text includes a pair of adjacent words may be beneficial in that it typically leads to a plurality of candidate suggested subsequent texts without leading to many irrelevant candidate suggested subsequent texts.

The text analysis module 504 matches the detected text to text in the index, e.g., performs a string match function upon the index using the detected text as an argument. Alternatively, the text analysis module 504 checks the detected text against the index in chunks via a sliding window. Each chunk is a number of characters or words against which the detected text is checked by the text analysis module 504 at one time to determine whether the detected text matches the chunk. Depending upon the embodiment, the text analysis module 504 may check the detected text against a chunk by comparing the detected text and the chunk for an exact match or for a partial match, or by comparing the detected text and/or one or more synonyms and/or abbreviations of some or all of the detected text to the chunk and/or one or more synonyms and/or abbreviations of some or all of the text in the chunk. The text analysis module 504 may fetch the synonyms and/or abbreviations by referencing the detected text and/or chunk against a reference document, such as a thesaurus or an abbreviations sheet. One or more reference documents may be stored by the content management system 100, e.g., at the content storage 318. If the detected text matches the text of the chunk in the sliding window, the text analysis module 504 generates a candidate suggested subsequent text based off text in the index near the sliding window, e.g., the rest of the sentence including the text in the sliding window.

The auxiliary signal module 506 fetches auxiliary data from one or more locations, e.g., a client device 120 of the user that typed the detected text, the content storage 318, the collaborative content item database 408, and/or training database 514. As described below, auxiliary data can provide additional discriminating features for a machine-learning model 511 of the machine learning module 510. Depending upon the embodiment, auxiliary data can include a representation of a global notetaking style, a representation of a notetaking style of the user, a type of meeting, an agenda for the meeting, a document related to the meeting, metadata of the meeting, user names from a meeting invitation and respective roles within an organization, results of a prior suggested subsequent text, a past document generated by the user, a past meeting transcription and a respective content item, a dictionary of common phrases, a manually labeled portion of a meeting transcript, a manually labeled portion of a content item, and/or other data from the client device 120, content management system 100, and/or collaborative content management system 130. The auxiliary data may include an identifier of the user that entered the detected text into the content item.

The representation of the global notetaking style may be a document in the content storage 318 detailing a notetaking ruleset. Alternatively, the representation of the global notetaking style may be a feature vector generated by a machine-learning model 511 to represent a notetaking style of members of an organization (e.g., a plurality of users attending a meeting or employees of an organization). Similarly, the representation of the notetaking style of the user may be a document in the content storage 318 detailing a notetaking ruleset for the user or a feature vector generated by a machine-learning model 511 to represent a notetaking style of the user.

The type of meeting may be one of a plurality of meeting types, such as an internal meeting or an external meeting.

The agenda for the meeting and/or the document related to the meeting may be a document associated with a meeting whose audio is being transcribed, e.g., a document included in a meeting invitation received by the user and/or sharing a title with the meeting. The metadata of the meeting may be metadata of the meeting invitation, such as a number of invitees, a length of the meeting, a title of the meeting, a time of the meeting, and a date of the meeting. The dictionary of common phrases may be a document stored by the content storage 318, such as a document providing key-value pairs of phrases and their synonyms and/or definitions.

The auxiliary signal module 506 may determine that one or more auxiliary data are relevant to a particular instance of transcript-based auto-complete by evaluating relationships among the auxiliary data and the particular instance of transcript-based auto-complete. For example, the auxiliary signal module 506 may determine that a meeting is in progress based on the user's calendar and scrape related auxiliary data, such as documents attached to the meeting invitation, or by searching the content storage 318, the collaborative content item database 408, and/or training database 514 for documents to which the user has access that include text that matches text from the calendar item, such as a document that shares at least part of a title with the calendar item. The auxiliary signal module 506 may determine that a document was shared with at least a predefined threshold of attendees of a meeting, and thereby identify the document as auxiliary data relevant to an instance of transcript-based auto-complete during the meeting by a user attending the meeting. The auxiliary signal module 506 may additionally identify as auxiliary data one or more emails exchanged among attendees to a meeting during which an instance of transcript-based auto-complete is to be performed.

In an embodiment, the auxiliary signal module 506 identifies a current speaker (e.g., a user that most recently uttered) and generates a tag (e.g., an at-mention) for the current speaker as part of the suggested subsequent text. In an embodiment, the transcript includes, for each portion of text, an indication of a speaker that uttered the words of the text. The auxiliary signal module 506 may search a staff directory or other document that identifies users (e.g., such a document stored at the content storage 318) for a user that matches the identity of the current speaker as indicated by the transcript. The auxiliary signal module 506 then scrapes from the document contact information for the current speaker, which the auxiliary signal module 506 uses to generate the tag.

In an embodiment, the auxiliary data includes an importance signal received from one or more users. The importance signal is an input to the machine learning model that distinguishes a portion of the transcript as particularly important. For example, the importance signal may be a visual indication of importance and/or an audio indication of importance, such as a key word or a particular hand motion, that indicates recent utterances (e.g., utterances from the past ten seconds) in an audio stream are important. This type of auxiliary data can be used to increase weighting in the machine learning model for the respective recent portion of the transcript. For example, the importance signal can be provided as a feature as part of the auxiliary data input to the machine-learning model 511. The importance signal may alternatively be a particular keystroke, or receipt of user selection of an importance signal widget (e.g., a button) in a user interface of the content item editor 270.

In an embodiment, the auto-complete module 324 includes the heuristics module 508 and not the machine learning module 510. The heuristics module 508 identifies a suggested subsequent text by evaluating the candidate suggested subsequent texts using one or more heuristics.

In an embodiment, the auto-complete module 324 includes the machine learning module 510 and not the heuristics module 508. The machine learning module 510 includes one or more trained machine-learning models 511. The machine learning module 510 receives one or more candidate suggested subsequent texts and scores them each, using the machine-learning model 511, for potential provision as a suggested subsequent text. The machine learning module 510 sends one or more candidate suggested subsequent texts and, in some embodiments, respective scores to the postprocessing module 512. The machine learning module 510 may discard one or more candidate suggested subsequent texts, such as candidate suggested subsequent texts with scores below a threshold score, before sending the remaining candidate suggested subsequent texts to the postprocessing module 512.

The machine learning module 510 can train the machine-learning model 511, and can train multiple machine-learning models 511, e.g., one for each user of an organization using the content management system 100 and/or collaborative content management system 130. User-specific machine-learning models 511 can be used to identify suggested subsequent texts that are particular to the user, e.g., that relate to features of the user such as a role within an organization. The machine learning module 510 trains a machine-learning model 511 on data from the training database 514, which is described below.

The machine-learning model 511 can be any of a variety of machine-learning models, such as a neural network (e.g., a convolutional neural network). The machine-learning model 511 takes as input one or more transcripts (and/or portions thereof) and/or candidate suggested subsequent texts identified by the text analysis module 504, a detected text, and, in some embodiments, auxiliary data, and outputs scores for each of the candidate suggested subsequent texts.

The training database 514 is a data store that includes data used to train the machine-learning model 511. The training database 514 may store transcripts (e.g., a past meeting transcription), respective content items (e.g., a past document generated by the user), respective suggested subsequent texts, and records of whether those suggested subsequent texts were incorporated into the content item, which can be used to further train the machine-learning model 511 over time as the data is accumulated. Text typed into a content item by a user can be weighted more highly than utterances from the transcript that were not typed into the content item because text typed by a user indicates it is text the user would have incorporated into the content item if it were suggested.

Depending upon the embodiment, the training database 514 may additionally or alternatively include auxiliary data used to train the machine-learning model 511, and can be used to further train the machine-learning model 511 over time as auxiliary data is accumulated. Training data in the training database 514 may be labeled manually or automatically, with positive and/or negative labels, for use in training machine-learning models 511 to discriminate candidate suggested subsequent texts based on a likelihood that the user will apply the candidate suggested subsequent text to the content item. The training database 514 can be one data store or a distributed set of data stores.

The postprocessing module 512 ranks the candidate suggested subsequent texts by their scores and sends one or more to the content item editor 270. The postprocessing module 514 may adjust scores according to one or more bias factors before ranking the candidate suggested subsequent texts (alternatively or additionally, these biases may be incorporated into the machine-learning model 511 by assigning or adjusting one or more weights). For example, the postprocessing module 514 may bias towards (e.g., increase the score for suggested subsequent texts that are based on) utterances from recent speakers and/or against (e.g., decrease the score for suggested subsequent texts that are based on) utterances by the user from whom the detected text originated. The postprocessing module 514 may bias towards utterances corresponding to importance signals. The postprocessing module 514 may bias towards a portion of the transcript corresponding to a timestamp where at least a predefined threshold of users (e.g., two users) input the same text into the content item close to the time of the timestamp and within a threshold amount of time of one another (e.g., ten seconds). The bias may be increased proportional to the number of users that have input the same text into the content item close to the time of the timestamp and within the threshold amount of time of one another. The postprocessing module 512 may bias towards suggested subsequent texts with timestamps closer to a current time more than suggested subsequent texts with timestamps less close to the current time. For example, a suggested subsequent text corresponding to an utterance timestamped five seconds in the past may be assigned a greater weight than a suggested subsequent text corresponding to an utterance timestamped ten minutes in the past.

The postprocessing module 514 may identify a highest ranked candidate suggested subsequent text as the suggested subsequent text that it sends to the content item editor 270. Alternatively, the postprocessing module 514 may send some or all of the candidate suggested subsequent texts to the content item editor 270 for display (e.g., ordered in accordance with their ranking), where the user can select one for insertion into the content item. The one or more suggested subsequent texts displayed to the user may or may not be visible to other users accessing the content item, depending upon the embodiment. The content item editor 270 may send a notification to the machine learning module 510 identifying whether the user accepted the suggested subsequent text for insertion into the content item.

In an embodiment, users editing disparate documents may opt into receiving suggested subsequent texts based on one or more of the disparate documents being edited by the other users. The auto-complete module 324 may send a user editing a document an offer to receive suggested subsequent texts based on other documents being edited by other users. If the user accepts the offer, the auto-complete module 324 may apply the other documents as auxiliary data to the machine-learning model 511.

Exemplary Illustration of Suggested Text

Figure 6A:
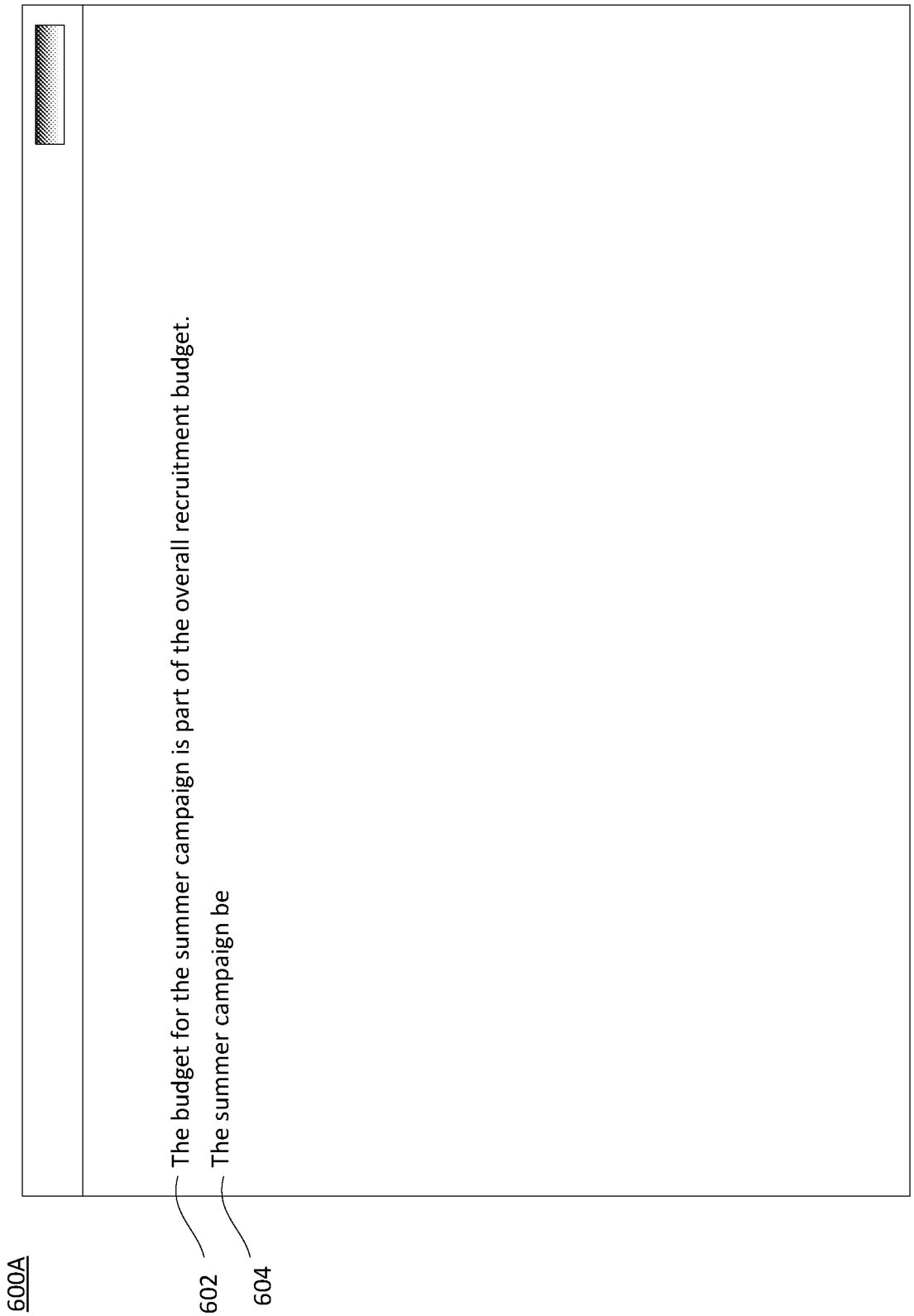
FIGS. 6A-6C show exemplary user interfaces for a content item with transcript-based auto-complete, according to one example embodiment.
Figure 6B:
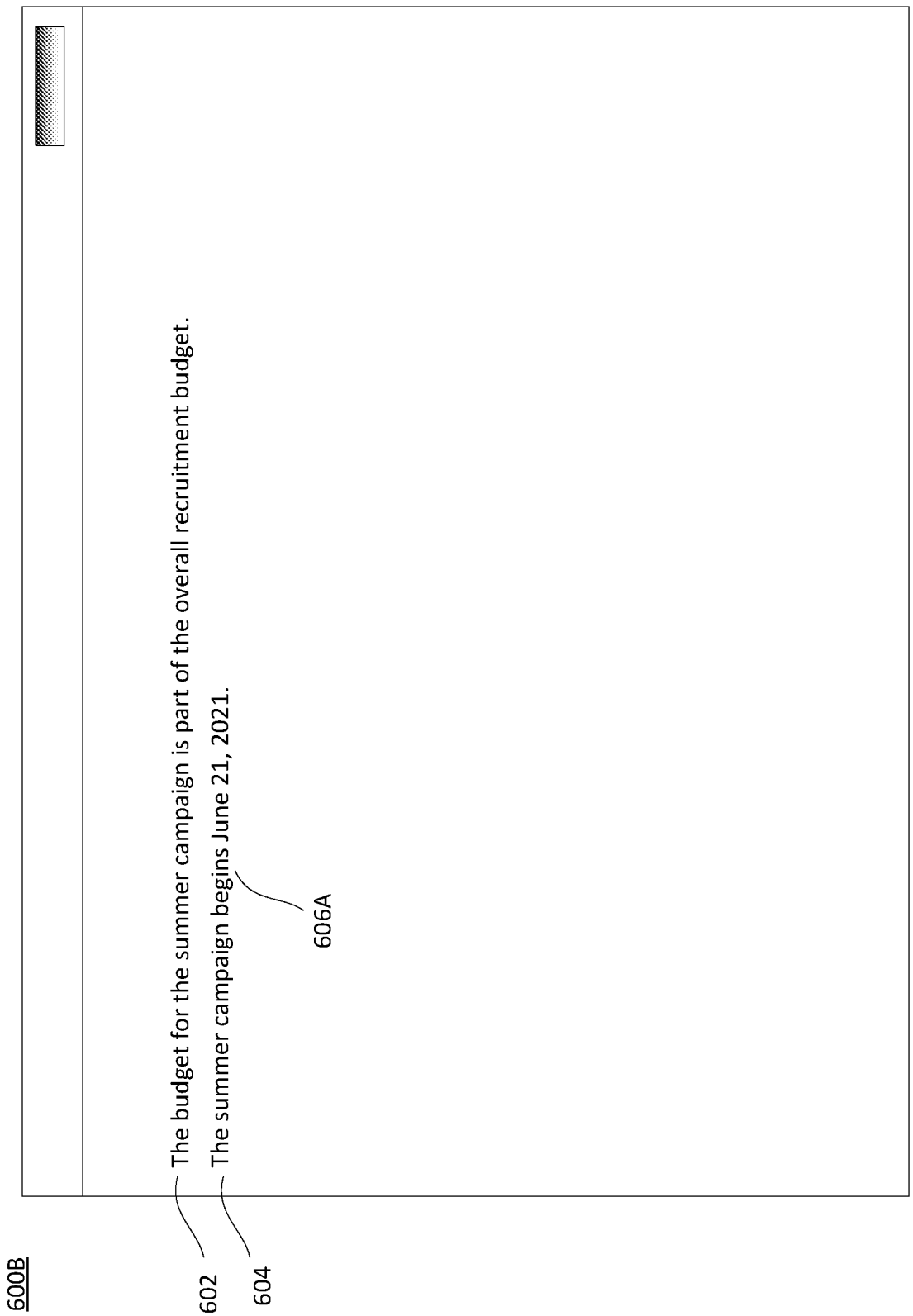
Figure 6C:
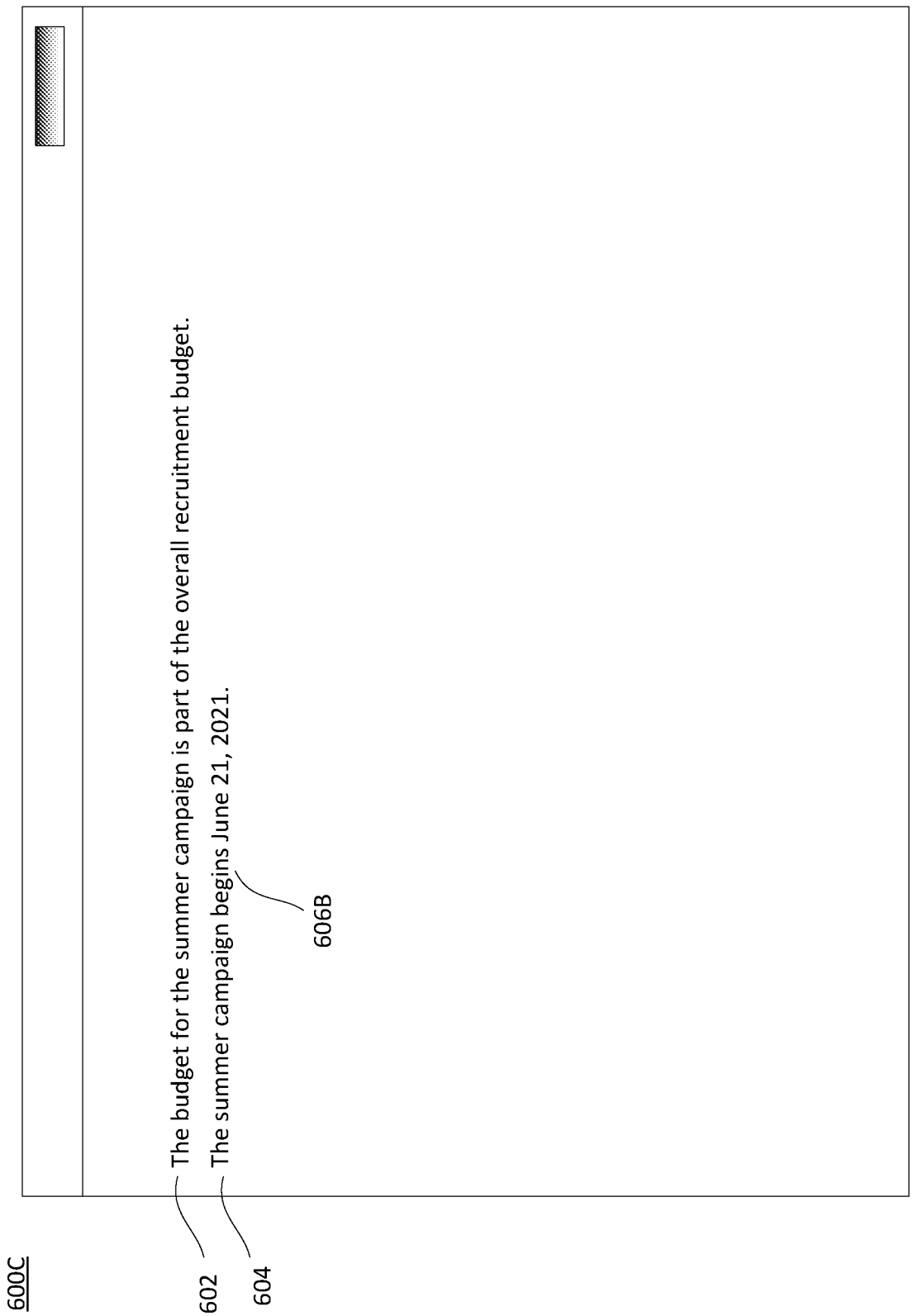

FIGS. 6A-6C show exemplary user interfaces for a content item with transcript-based auto-complete, according to one example embodiment. In FIG. 6A, a user interface 600A is displayed, e.g., a user interface provided by the user interface module 302 via the communication interface 300. The user interface 600A includes a representation of a text document including text 602 and recent text 604, e.g., a text document of the content item editor 270 or collaborative content item editor 404. The recent text 604 is text entered by a user into the text document that satisfies an auto-complete parameter. As such, the content management system 100 generates a suggested subsequent text for the recent text 604.

In FIG. 6B, a user interface 600B is displayed, particularly at a time when suggested subsequent text 606A is presented in association with the recent text 604. The user interface 600B still includes the text 602. The suggested subsequent text 606A is visually distinguished from text 602 and recent text 604 entered by the user. In the example of the figure, the suggested subsequent text 606A is displayed in a different font color than text 602 and recent text 604; in alternative embodiments, one or more alternative or additional visual distinctions may be employed without departing from the techniques put forth herein.

In FIG. 6C, a user interface 600C is displayed, particularly at a time after the user has accepted the suggested subsequent text. The user interface 600C still includes text 602 and recent text 604. The user interface 600C additionally includes subsequent text 606B, which is input to the text document subsequent to the recent text 604 upon user acceptance of the suggested subsequent text 606A, e.g., via a particular user input from a user input device to a computer displaying the user interfaces 600. In an embodiment, the particular user input is a keystroke, e.g., a tab or enter keystroke.

Exemplary Process Flows

Figure 7:
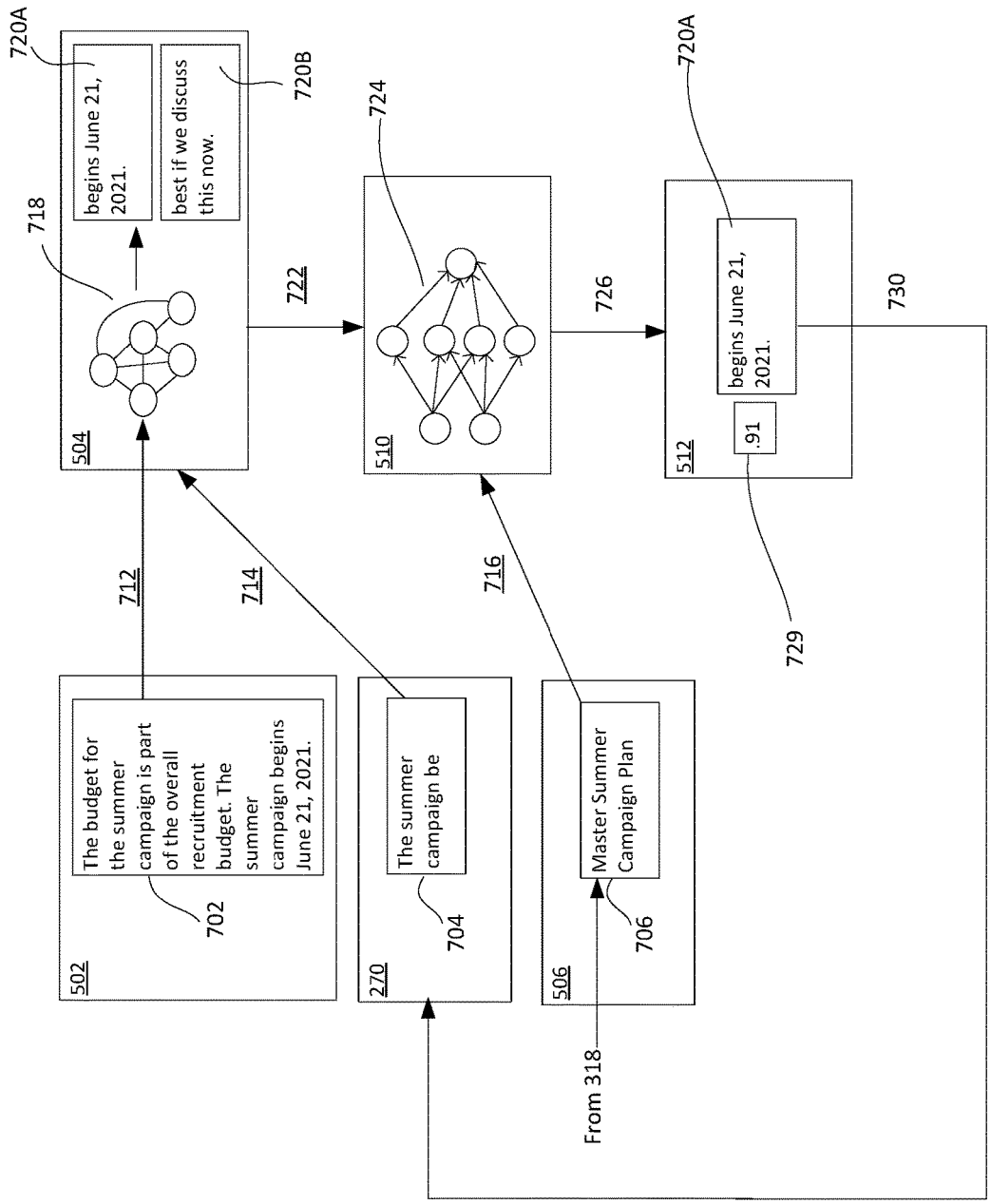
FIG. 7 shows a data flow diagram for transcript-based auto-complete, according to one example embodiment.

FIG. 7 shows a data flow diagram for transcript-based auto-complete, according to one example embodiment. The transcription module 502 receives stream of data forming a transcript 702 of audio data as it is uttered (e.g., after an utterance in the audio data, the transcription module 502 receives a transcription of the utterance). The transcription module 502 receives the stream of data from a transcription engine, which may be a component of the content management system 100 and/or collaborative content management system 130. Alternatively, the transcription engine may be a third-party service, e.g., a software application at a remote server accessible via an application programming interface (API).

The transcription module 502 sends 712 the transcript 702 to the text analysis module 504, which indexes the transcript 702 for referencing against detected text. The index 718 may be a Markov model constructed by the text analysis module 504 and updated as additional portions of the transcript 702 are received from the transcription module 502. In the example of the figure, a detected text 704 "summer campaign be" satisfies an auto-complete parameter. As such, the text analysis module 504 matches the detected text to portions 720 of the transcript 702. The portions 720 include portion 720A, "begins Jun. 21, 2021," and portion 720B, "best if we discuss this now." Some or all of the portions 720 are sent by the text analysis module 504 to the machine learning module 510. In an embodiment, only portions 720 uttered less than a threshold time ago are sent to the machine learning module 510. In this manner, portions 720 unlikely to be valid subsequent texts are ignored, improving the efficiency of the system by reducing the data to be analyzed.

The detected text 704 is sent 714 from the content item editor 270 to the text analysis module 504. For example, the content item editor 270 may include an event listener/handler that listens for text entry and sends text as it is typed to the text analysis module 504, or, in an embodiment, only text matching the auto-complete parameter. Alternatively, the content item editor 270 may stream text to the text analysis module 504, or the text analysis module 504 may periodically fetch text from the content item editor 270, e.g., via an endpoint exposed via an API of the content item editor 270. In an embodiment, the content item editor 270 only sends 714 a portion of the detected text 704 to the content item editor 270.

The text analysis module 504 sends 722 the portions 720 to the machine learning module 510. The machine learning module 510 includes a trained machine-learning model 724. The machine learning module 510 applies the machine-learning model 724 to the portions 720 to produce a suggested subsequent text or scores for each of the portions 720. In embodiments where the machine learning module 510 does not directly identify a suggested subsequent text, the machine learning module 510 sends 726 the portions 720 and respective scores to the postprocessing module 512.

In an embodiment, the machine learning module 510 also receives 716 auxiliary data 706 from the auxiliary signal module 506. The auxiliary signal module 506 fetches auxiliary data 706 from one or more locations, e.g., a client device 120 of the user that typed the detected text 704. For example, the auxiliary data 706 may be a meeting invitation from an electronic mail application at the client device 120, where the meeting invitation corresponds to a meeting whose audio data is being transcribed. Auxiliary data 706 can improve the accuracy of the machine-learning model 724 by providing additional discriminating features.

The machine learning module 510 either identifies a suggested subsequent text, which is sent to the content item editor 270 for display adjacent to the detected text 704, or sends the portions 720 and respective scores to the postprocessing module 514. The postprocessing module 514 ranks the portions, e.g. portion 720A, by their scores, e.g., score 729, which is the score of portion 720A. The postprocessing module 514 may adjust scores according to one or more bias factors before ranking the portions 720. The postprocessing module 514 may identify a highest ranked portion 720 as the suggested subsequent text that it sends 730 to the content item editor 270. For example, if portion 720A's score 729 of 0.91 is greater than a score of portion 720B, then portion 720A is sent 730 by the postprocessing module 512 to the content item editor 270. Alternatively, the postprocessing module 514 may send some or all of the portions 720 to the content item editor 270, where the user can select one for insertion into the content item. The content item editor 270 may send a notification to the machine learning module 510 identifying whether the user accepted the suggested subsequent text for insertion into the content item, which can be used to further refine the machine learning model 724 by weighting the accepted suggested subsequent text higher than other text from the transcript and/or weighting suggested subsequent text rejected by the user lower than other text from the transcript. In this manner, the content management system 100 may improve the functioning of the auto-complete module 324 over time.

In an alternative embodiment, instead of or in addition to the machine learning module 510, the system includes a heuristics module that identifies a suggested subsequent text by evaluating the candidate suggested subsequent texts using one or more heuristics. In this embodiment, the heuristics module sends the suggested subsequent text to the content item editor 270.

Figure 8:
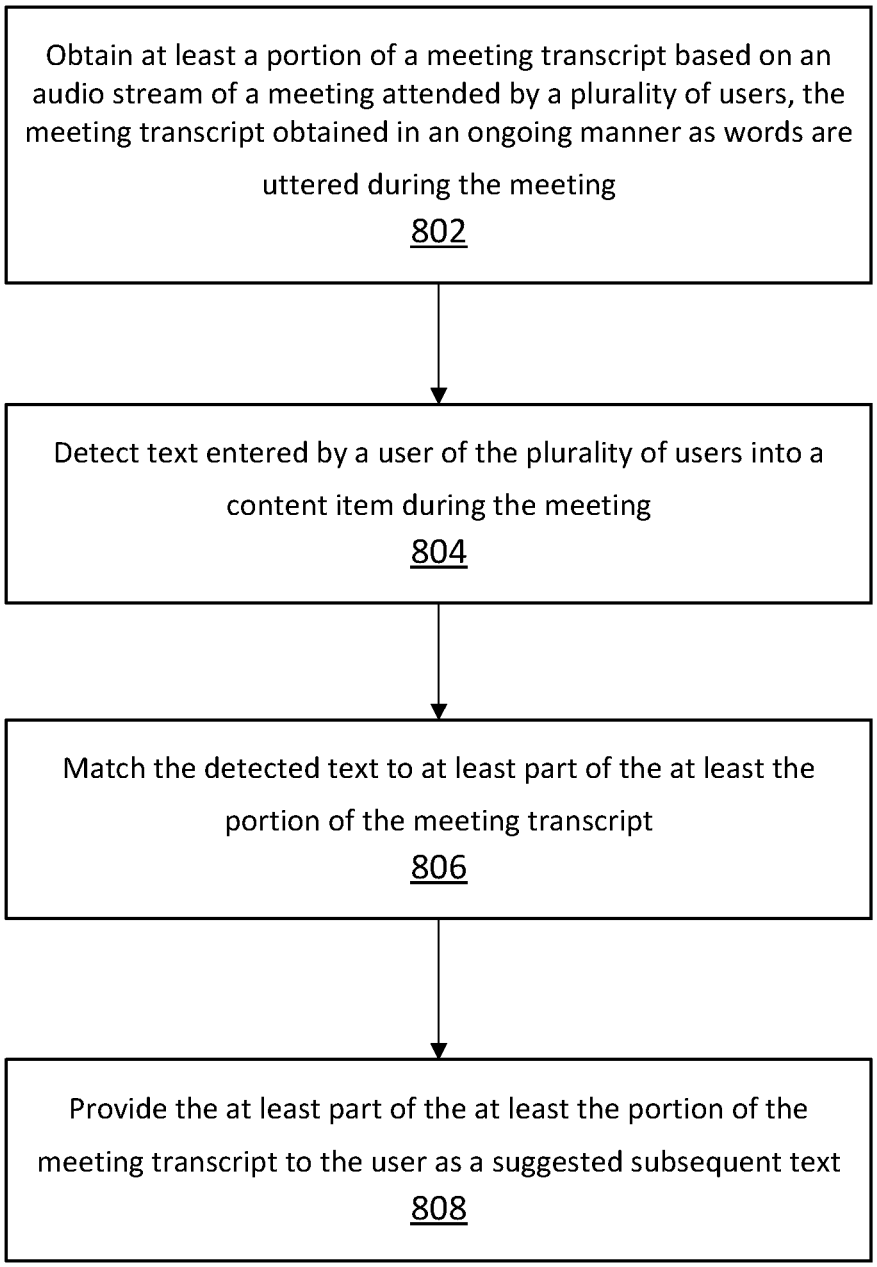
FIG. 8 shows an exemplary process for performing transcript-based auto-complete, according to one example embodiment.

FIG. 8 shows an exemplary process for performing transcript-based auto-complete, according to one example embodiment. The content management system 100 obtains 802 (e.g., using the transcription module 502) at least a portion of a meeting transcript (e.g., the text shown with reference sign 702) based on an audio stream of a meeting attended by a plurality of users, the meeting transcript obtained in an ongoing manner as words are uttered during the meeting.

The content management system detects 804 (e.g., using the text analysis module 504 and/or content item editor 270), text entered by a user of the plurality of users into a content item during the meeting (e.g., the text shown with reference sign 704). In an embodiment, the detected text is text that satisfies an auto-complete parameter. Depending upon the embodiment, there may be one or more auto-complete parameters.

The content management system 100 matches 806 (e.g., using the text analysis module 504) the detected text to at least part of the at least the portion of the meeting transcript. In one embodiment, the content management system matches 806 the detected text to at least part of the at least the portion of the meeting transcript using one or more heuristics.

In a second embodiment, the content management system 100 inputs (e.g., using the text analysis module 504) the detected text and at least part of the at least the portion of the meeting transcript associated with the detected text into a trained machine-learning model (e.g., the model shown with reference sign 724 at the machine learning module 510). The content management system 100 may also input (e.g., using auxiliary signal module 506) auxiliary data into the machine-learning model. Inputting into the machine-learning model may be responsive to the detected text satisfying the one or more auto-complete parameters. The content management system 100 determines (e.g., using the machine learning module 510) one or more candidate suggested subsequent texts (e.g., the text shown with reference sign 720A) based on output from the machine-learning model. If there is one candidate suggested subsequent text, it is the suggested subsequent text. If there are multiple candidate suggested subsequent texts, the machine-learning model may score (e.g., the number shown with reference sign 729) each of the candidate suggested subsequent texts. The content management system 100 ranks (e.g., using the postprocessing module 512) the candidate suggested subsequent texts based on their scores.

The content management system provides 808 (e.g., using the postprocessing module 512) the at least part of the at least the portion of the meeting transcript to the user as a suggested subsequent text. In an embodiment where there are multiple candidate suggested subsequent texts ranked by the machine-learning model, the at least part of the at least the portion of the meeting transcript is the suggested subsequent text, which may be selected (e.g., using the postprocessing module 512) from the candidate suggested subsequent texts by user input or by having a highest score among the candidate suggested subsequent texts.

Additional Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

In this description, the term "module" refers to a physical computer structure of computational logic for providing the specified functionality. A module can be implemented in hardware, firmware, and/or software. In regards to software implementation of modules, it is understood by those of skill in the art that a module comprises a block of code that contains the data structure, methods, classes, header and other code objects appropriate to execute the described functionality. Depending on the specific implementation language, a module may be a package, a class, or a component. It will be understood that any computer programming language may support equivalent structures using a different terminology than "module."

It will be understood that the named modules described herein represent one embodiment of such modules, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of a system, loaded into memory, and executed by the one or more processors of the system's computers.

The operations herein may also be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including optical disks, CD-ROMs, read-only memories (ROMs), random access memories (RAMs), magnetic or optical cards, or any type of media suitable for storing electronic instructions, and each coupled to a computer system bus. Furthermore, the computers referred to in the specification may include a single processor or may be architectures employing multiple processor designs for increased computing capability.

The algorithms presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used herein, the word "or" refers to any possible permutation of a set of items. Moreover, claim language reciting 'at least one of' an element or another element refers to any possible permutation of the set of elements.

Although this description includes a variety of examples and other information to explain aspects within the scope of the appended claims, no limitation of the claims should be implied based on particular features or arrangements these examples. This disclosure includes specific embodiments and implementations for illustration, but various modifications can be made without deviating from the scope of the embodiments and implementations. For example, functionality can be distributed differently or performed in components other than those identified herein. This disclosure includes the described features as non-exclusive examples of systems components, physical and logical structures, and methods within its scope.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method comprising:
   obtaining at least a portion of a meeting transcript based on an audio stream of a meeting attended by a plurality of users, the at least the portion of the meeting transcript obtained in an ongoing manner as words are uttered during the meeting;
   detecting text entered by a user from the plurality of users during the meeting;
   inputting at least a portion of the detected text and at least part of the at least the portion of the meeting transcript associated with the detected text into a trained machine-learning model;
   determining, based on output from the trained machine-learning model, a suggested subsequent text; and
   adding the suggested subsequent text to a content item.

2. The method of claim 1, wherein the detected text includes a predefined number of adjacent words entered by the user within a threshold time of one another.

3. The method of claim 1, wherein the trained machine-learning model generates a score for each of a plurality of candidate suggested subsequent texts, and wherein the method further comprises:
   generating for display, in visual association with the detected text, a subset of the plurality of candidate suggested subsequent texts in descending order by score, wherein candidate suggested subsequent texts of the plurality of candidate suggested subsequent texts are included in the subset of the plurality of candidate suggested subsequent texts when respective scores exceed a threshold score value; and
   receiving selection of a candidate suggested subsequent text from the subset of the plurality of candidate suggested subsequent texts, wherein the selected candidate suggested subsequent text is the suggested subsequent text.

4. The method of claim 1, further comprising:
   wherein inputting the at least the portion of the detected text and at least part of the at least the portion of the meeting transcript associated with the detected text into a trained machine-learning model further comprises inputting auxiliary data into the trained machine-learning model; and
   wherein the auxiliary data comprises one or more of a representation of a global notetaking style, a representation of a notetaking style of the user, a type of meeting, an agenda for the meeting, a document related to the meeting, metadata of the meeting, user names from a meeting invitation and respective roles within an organization, results of a prior suggested subsequent text, a past document generated by the user, a past meeting transcription and a respective content item, a dictionary of common phrases, a manually labeled portion of a meeting transcript, and a manually labeled portion of a content item.

5. The method of claim 1, wherein the meeting transcript comprises timestamps representing when portions of the meeting transcript were uttered, wherein the at least part of the at least the portion of the meeting transcript associated with the detected text comprises a first part with a first time stamp and a second part with a second time stamp nearer to a current time than the first time stamp, and wherein the trained machine-learning model assigns the second part a higher weight than the first part based on the respective time stamps.

6. The method of claim 1, wherein the meeting transcript comprises indications of which user uttered which portions of the meeting transcript, wherein the trained machine-learning model weights portions of the meeting transcript uttered by a first user with a higher weight than portions of the meeting transcript uttered by a second user based on the first user having uttered a given portion of the meeting transcript more recently than the second user, and wherein the trained machine-learning model weights portions of the meeting transcript uttered by the user that entered the detected text with a lower weight than is applied to portions of the meeting transcript uttered by other users of the plurality of users.

7. The method of claim 1, further comprising:
receiving, from the user, an importance signal; and
responsive to receiving the importance signal, increasing bias for the trained machine-learning model towards more recent utterances.

8. The method of claim 1, further comprising:
generating different suggested subsequent texts for a plurality of users in parallel based on respective detected texts from each of the plurality of users.

9. The method of claim 1, further comprising:
receiving at least a portion of a second meeting transcript based on a second audio stream in parallel to the at least the portion of the meeting transcript based on the audio stream; and
wherein inputting the at least the portion of the detected text and at least part of the at least the portion of the meeting transcript associated with the detected text into a trained machine-learning model further comprises inputting into the trained machine-learning model the at least the portion of the second meeting transcript.

10. The method of claim 1, further comprising:
receiving, from at least a predefined threshold of users of the plurality of users, at least one of a visual indication of importance and an audio indication of importance; and
responsive to receiving, from at least the predefined threshold of users of the plurality of users, at least one of a visual indication of importance and an audio indication of importance, increasing bias for the trained machine-learning model towards a recent portion of the meeting transcript.

11. The method of claim 1, further comprising:
receiving, from at least a predefined threshold of users of the plurality of users, a same text as the detected text within a threshold time range of one another; and
responsive to receiving, from at least the predefined threshold of users of the plurality of users, the same text within the threshold time range of one another, increasing one or more weights for the trained machine-learning model towards a portion of the meeting transcript spanning the threshold time range.

12. The method of claim 1, wherein the suggested subsequent text is one of a plurality of candidate suggested subsequent texts, the method further comprising:
identifying the plurality of candidate suggested subsequent texts, the identifying comprising matching the detected text to a plurality of portions of the meeting transcript that include text similar to the detected text.

13. The method of claim 1, wherein the trained machine-learning model is trained on at least one stored meeting transcript and respective content item, wherein text in the at least one stored meeting transcript is timestamped to indicate a time of utterance and text in the respective content item is timestamped to indicate a time of entry to the content item.

14. A non-transitory computer-readable storage medium storing computer program instructions executable by at least one processor to perform operations, the instructions comprising instructions to:
obtain at least a portion of a meeting transcript based on an audio stream of a meeting attended by a plurality of users, the at least the portion of the meeting transcript obtained in an ongoing manner as words are uttered during the meeting;
detect text entered by a user from the plurality of users during the meeting;
input at least a portion of the detected text and at least part of the at least the portion of the meeting transcript associated with the detected text into a trained machine-learning model;
determine, based on output from the trained machine-learning model, a suggested additional text; and
add the suggested additional text to a content item.

15. The non-transitory computer-readable storage medium of claim 14, wherein the detected text includes a predefined number of adjacent words entered by the user within a threshold time of one another.

16. The non-transitory computer-readable storage medium of claim 14, wherein the trained machine-learning model generates a score for each of a plurality of candidate suggested additional texts, and wherein the instructions further comprise instructions to:
generate for display, in visual association with the detected text, a subset of the plurality of candidate suggested additional texts in descending order by score, wherein candidate suggested additional texts of the plurality of candidate suggested additional texts are included in the subset of the plurality of candidate suggested additional texts when respective scores exceed a threshold score value; and
receive selection of a candidate suggested additional text from the subset of the plurality of candidate suggested additional texts, wherein the selected candidate suggested additional text is the suggested additional text.

17. The non-transitory computer-readable storage medium of claim 14, wherein:
inputting the at least the portion of the detected text and at least part of the at least the portion of the meeting transcript associated with the detected text into a trained machine-learning model further comprises inputting auxiliary data into the trained machine-learning model; and
the auxiliary data comprises one or more of a representation of a global notetaking style, a representation of a notetaking style of the user, a type of meeting, an agenda for the meeting, a document related to the meeting, metadata of the meeting, user names from a meeting invitation and respective roles within an organization, results of a prior suggested additional text, a past document generated by the user, a past meeting transcription and a respective content item, a dictionary of common phrases, a manually labeled portion of a meeting transcript, and a manually labeled portion of a content item.

18. The non-transitory computer-readable storage medium of claim 14, wherein the meeting transcript comprises timestamps representing when portions of the meeting transcript were uttered, wherein the at least part of the at least the portion of the meeting transcript associated with the detected text comprises a first part with a first time stamp and a second part with a second time stamp nearer to a current time than the first time stamp, and wherein the trained machine-learning model assigns the second part a higher weight than the first part based on the respective time stamps.

19. A system comprising:
   at least one processor; and
   a non-transitory computer-readable storage medium storing computer program instructions executable by the at least one processor, the instructions when executed causing the at least one processor to perform operations, the operations comprising:
      obtaining at least a portion of a meeting transcript based on an audio stream of a meeting attended by a plurality of users, the at least the portion of the meeting transcript obtained in an ongoing manner as words are uttered during the meeting;
      detecting text entered by a user from the plurality of users into a content item during the meeting;
      inputting at least part of the at least the portion of the meeting transcript associated with the detected text into a trained machine-learning model;
      determining, based on output from the trained machine-learning model, a suggested additional text; and
      adding the suggested additional text to the content item.

20. The system of claim 19, wherein the detected text includes a predefined number of adjacent words entered by the user within a threshold time of one another.

\* \* \* \* \*